Sept. 30, 1941.   C. M. HINES   2,257,300
ELECTRIC BRAKE CONTROL
Filed March 30, 1940
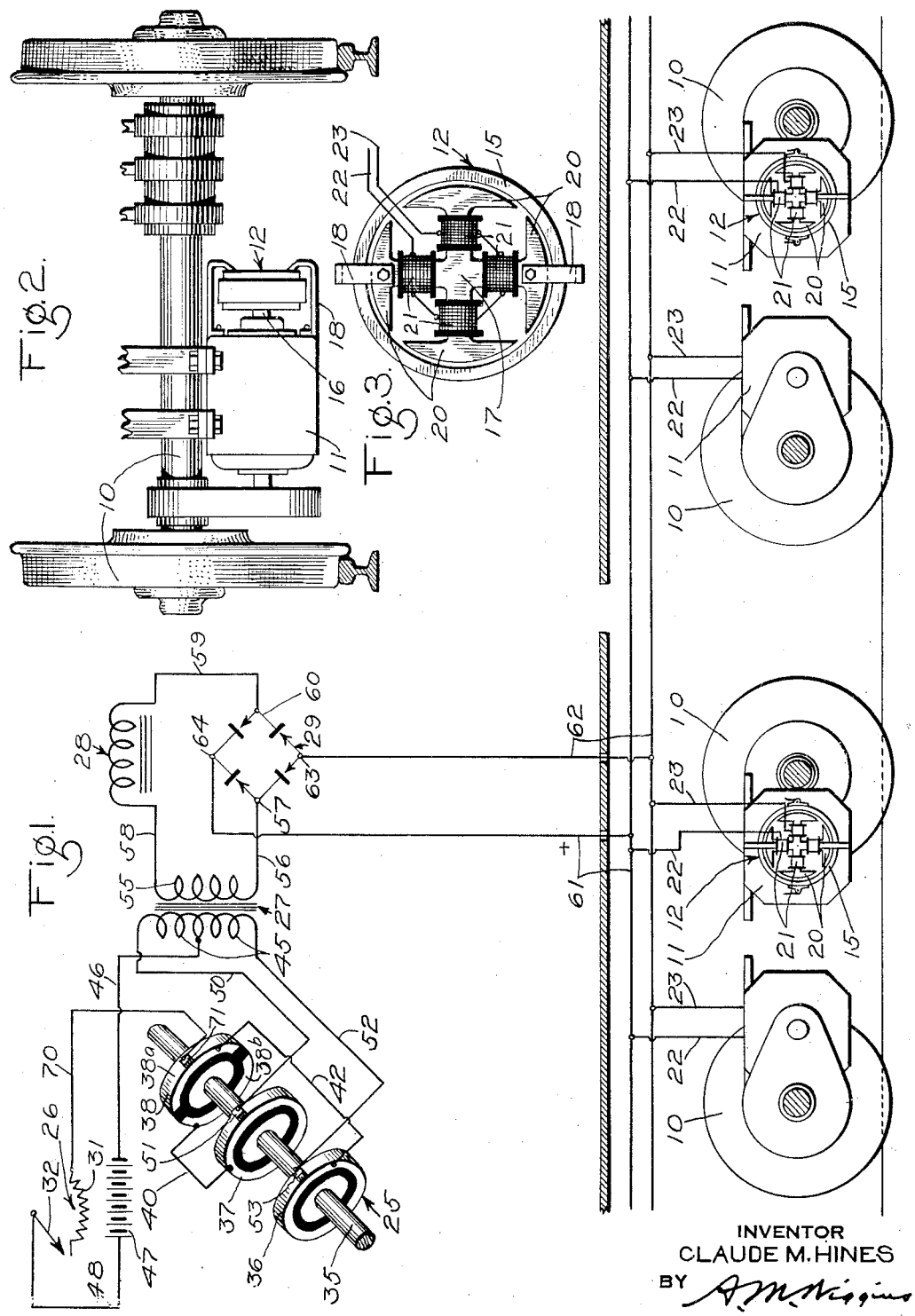
INVENTOR
CLAUDE M. HINES
BY *A. M. Higgins*
ATTORNEY Patented Sept. 30, 1941

2,257,300

UNITED STATES PATENT OFFICE 2,257,300

ELECTRIC BRAKE CONTROL

Claude M. Hines, Pittsburgh, Pa., assignor to The Westinghouse Air Brake Company, Wilmerding, Pa., a corporation of Pennsylvania Application March 30, 1940, Serial No. 326,871

11 Claims. (Cl. 188—181)

This invention relates to electrodynamic brakes of the eddy current type for braking vehicles, and more particularly to circuit control means for an eddy current brake.

In its usual form, the well known eddy current brake for vehicular use is not automatically operative to maintain a given braking effect throughout a broad range of speed over which the vehicle is operated. It is characteristic of this type of brake that when energized with a constant degree of exciting current it produces a diminishing braking effect as the speed of the vehicle declines to a low rate, so that the operator is required to vary the exciting current supplied to the eddy current brake if he desires to maintain the retarding effect uniform throughout the deceleration period.

It is a principal object of my invention to provide an improved eddy current brake apparatus including means responsive to vehicle speed for automatically controlling the exciting current supplied to the eddy current brake so as to render it operative to maintain a selected braking effect throughout a broad range of speed.

Another object of the invention is to provide an energizing circuit for an eddy current brake including speed responsive commutator means operative to convert direct current into alternating current of a frequency corresponding to the vehicle speed, reactor means for governing the resultant alternating current in accordance with the frequency, and rectifier means for delivering the modulated current in the form of direct current to the stator coils of the brake.

Other objects and advantages of the invention will appear in the following more detailed description thereof, taken in conjunction with the accompanying drawing, wherein Fig. 1 is a diagrammatic view of a vehicle truck having associated therewith an eddy current brake and control equipment constructed in accordance with the invention;

Fig. 2 is a fragmentary elevational view of a wheel and axle assembly equipped with an eddy current brake apparatus such as that shown in Fig. 1; and Fig. 3 is a schematic view illustrating the construction of an eddy current brake unit of a type employed with the equipment shown in Fig. 1.

Referring to Fig. 1, the vehicle may comprise a pair of four-wheel trucks having wheel and axle assemblies 10, each of which has associated therewith a driving motor 11, which is suitably supported from the truck frame, not shown, and is geared in the usual manner to the adjacent axle. Also associated with each of the driving motors 11 and supported by the housing thereof is an eddy current brake unit 12, which as hereinafter explained is in the present embodiment operative to impart a braking effect through the medium of the driving motor 11 to the wheel and axle assembly 10.

As is best shown in Figs. 2 and 3, each of the eddy current brake units 12 comprises a cylindrical rotor 15, which is secured to the shaft 16 of the driving motor by suitable means, not shown, and a stator 17, which is disposed within the rotor and is secured by bolts or other means to brackets 18 that are in turn mounted on the casing of the motor. The stator has four pole members 20, each of which carries a suitable energizing coil 21. The windings of the coils 21 are connected in a series circuit including lead conductors 22 and 23, and are operative when the circuit is energized as hereinafter explained to produce a magnetic field through which the rotor 15 is adapted to revolve. It will be understood that eddy current thereby generated in the rotor will react with the flux producing them to cause a braking effect.

According to the invention, elements of the brake control circuit provided for controlling the several eddy brake units include a commutator or alternator device 25, a manually operable brake controller 26, a transformer 27, a reactor 28, and a rectifier assembly 29, all of which elements are shown in diagrammatic form in Fig. 1 of the drawing.

The brake controller 26 is of the variable resistance type and comprises a resistor 31 and a movable contact element 32. The commutator device 25 may be of any suitable type and is constructed and arranged to be driven by one of the wheel and axle assemblies in any desired manner. As illustrated the commutator device comprises a rotary shaft 35, which is operatively connected with a wheel and axle assembly, and which has mounted thereon three suitably insulated annular contact members 36, 37, and 38, the latter of which is divided into two semicircular sections 38a and 38b that are insulated from each other as well as from the shaft 35. The contact member 37 of the commutator is permanently connected by way of a conductor 40 with the section 38b of member 38, and similarly, the contact member 36 is connected through the medium of a conductor 42 with the section 38a of the member 38.

The transformer 27 is provided with two primary windings 45 both having the same number of turns, and both being connected by way of a common conductor 46 to the negative terminal of a battery 47, the positive terminal of which is connected by a conductor 48 with the contact element 32 of the controller 26. The primary windings 45 of the transformer are also separately connected by a conductor 50 to a brush 51 engaging the contact member 37 of the commutator 25, and by a conductor 52 with a similar brush 53 engaging the contact member 36. The transformer 27 has a secondary winding 55, one end of which is connected to a conductor 56 leading to a junction point 57 of the rectifier assembly 29, and the other end of which is connected by means of a conductor 58 to the reactor coil 28, which is in turn connected to a conductor 59 leading to a junction point 60 of the rectifier assembly.

It will be readily apparent from the drawing that the rectifier assembly 29 comprises four rectifier elements arranged for full wave rectification, and that the assembly will be operative when energized by alternating current, as hereinafter explained, to cause flow of direct current through a circuit including a junction point 64, a conductor 61, the several lead conductors 22, the brake coils 21 of the respective eddy current brake units, the lead conductors 23, and a return conductor 62 leading to a junction point 63 of the rectifier assembly.

The operator may effect an application of the brakes by moving the movable control member 32 of the brake controller 26 from release position into the desired brake application position. The positive terminal of the battery 47 is then connected to the conductor 70 through the resistance 31, and by means of the commutator device 25 is alternately connected to the two primary windings 45 of the transformer 27. This will be apparent from the following explanation.

If at the instant conductor 70 is connected to the battery the commutator device is in the position illustrated, current flows to the lower winding 45 through conductor 70, brush 71, contact element 38a, conductor 42, contact element 36, brush 53, and conductor 52, the return to the battery being by way of conductor 46. For this position of the commutator device 25 the upper winding 45 is not connected to the battery.

As the shaft 35 rotates contact element 38a passes out from under the brush 71 and contact element 38b passes under the brush 71. As a result, lower winding 45 is disconnected from the battery and upper winding 45 is connected to the battery through conductor 70, brush 71, contact element 38b, conductor 40, contact element 37, brush 51 and conductor 50, the return to the battery being by way of conductor 46, as before. The two windings 45 are so arranged with respect to each other and to the secondary winding 55 that the current flowing in one winding 45 is opposite to the current flowing in the other, so that a true alternating current is induced in the secondary winding 55.

It will thus be apparent that as shaft 35 of the commutator device rotates in accordance with the speed of the vehicle the two primary windings 45 will be alternately energized, and that the frequency with which these windings are alternately connected and disconnected to the battery 47 is proportional to the speed of the vehicle. It will further be apparent that the alternating current induced in the secondary winding will have a frequency corresponding to the speed of the vehicle.

Now a characteristic feature of the reactor 28 is that it is effective to limit or choke the flow of alternating current to a degree proportional to the frequency of the current. It follows, therefore, that the alternating current flowing to the rectifier assembly 29 and the resultant direct current flowing through the eddy current brake circuit hereinbefore traced will consequently be varied in inverse proportion to any variation in the vehicle speed.

If the vehicle is moving at a high speed when the controller 26 is moved to brake application position, the frequency of the output current induced in the secondary winding 55 of the transformer will be high and the inductive reactance of the coil 28 will be correspondingly high. For this condition the reactor coil 28 greatly impedes the flow of alternating current which the rectifier assembly 29 feeds in the form of direct current to the eddy current brake units 12, it being understood that with the rotors 15 of the brake units revolving rapidly, the relatively low current thereby supplied for energizing the pole coils 21 is effective to produce the desired braking or dragging force on the rotors.

On the other hand, when the vehicle speed approaches a low value, the alternating current induced in the secondary winding 55 of the transformer, as a result of operation of the commutator device 25 with the associated wheel and axle assembly, will be of relatively low frequency, so that the inductive reactance of the reactor coil 28 will be correspondingly less effective to oppose the flow of current ultimately supplied to the respective eddy current brake units 12. It will thus be seen that although the rotors 15 of the brake units are turning at a slow rate, the coils 21 thereof will nevertheless be sufficiently energized, due to the higher current available, to produce the desired braking effect. The eddy current brake system constructed in accordance with my invention may thus be utilized to provide substantially uniform retarding effect for controlling deceleration of the vehicle throughout a wide range of speed.

Although a preferred embodiment of the invention has been described in detail, it is not intended to limit the scope thereof to that embodiment, or otherwise than by the terms of the appended claims.

Having now described my invention, what I claim as new and desire to secure by Letters Patent, is:

1. In a brake system for a vehicle, in combination, an electric brake device operable when energized to a constant degree to produce a braking effect which diminishes as the speed of the vehicle with which it is associated diminishes, means governed by the speed of the vehicle for causing pulsations in electric current in the circuit for said brake device, and reactor means in said circuit for varying the energization of said brake device as the speed of the vehicle varies to cause said brake device to produce a substantially constant braking effect.

2. In a brake system for a vehicle, in combination, an electric brake device operable when a constant current is supplied through a brake circuit to produce a braking effect which diminishes as the speed of the vehicle diminishes, means for supplying current to said brake circuit to produce a braking effect, means governed by the speed of the vehicle for producing pulsations in said current as it flows through said circuit, and reactor means in said circuit for controlling the degree of current supplied to said brake means.

3. In a vehicle brake system, in combination, an electric brake device having a winding to which current is supplied to cause the brake device to produce a braking effect, a source of direct current, means including a device responsive to the speed of the vehicle for supplying current from said source to said winding and operable to transform the current from direct to alternating and then back to direct, and means including the device responsive to the speed of the vehicle for controlling the degree of current supplied to said winding by controlling said current in its alternating state.

4. In a vehicle brake system, in combination, an electric brake device operable when current is supplied thereto at a constant value to produce a braking effect which diminishes as the speed of the vehicle with which it is associated diminishes, means for supplying current to said brake device to variable degrees, and means including a rotary contact arrangement operated according to the speed of the vehicle for varying the degree of the current supplied to said brake device from said source in a manner to increase the value of the current supplied as the speed of the vehicle diminishes.

5. In a vehicle brake system, in combination, an electric brake device having a winding to which current is supplied to cause said brake device to produce a braking effect, means for producing an alternating current having a frequency substantially proportional to the speed of the vehicle with which the brake device is associated, means for transforming said alternating current into direct current and for supplying the transformed direct current to said winding, and means cooperating with said alternating current producing means for causing the current supplied to said winding to be automatically increased as the speed of the vehicle diminishes.

6. In a vehicle brake system, in combination, an electric brake device of the type which for a constant degree of energization produces a braking effect which diminishes as the speed of the vehicle with which it is associated diminishes, means for supplying current to said brake device to energize it, a current modulating means, means operated according to the speed of the vehicle, and means whereby said current modulating means and said speed operated means cooperate to regulate the degree of current supplied to said electric brake device.

7. In a vehicle brake system, in combination, an electric brake device operable when curent is supplied thereto to produce a braking effect on the vehicle, a source of direct current, a transformer device having two primary windings and a single secondary winding, a contact mechanism operated according to the speed of the vehicle for alternately connecting said two primary windings to said source of direct current in a manner to produce an alternating current in said secondary winding, means for translating the alternating current delivered by said secondary winding into direct current and for supplying the direct current to said electric brake device, and means for modulating the degree of electric current supplied to said brake device in accordance with the speed of the vehicle.

8. Control means for a vehicle brake of the eddy current type, comprising a circuit including a source of alternating current, the frequency of which varies in proportion to vehicle speed, reactor means for modulating said alternating current in accordance with the frequency, and rectifier means for converting said modulated current into direct current for energizing said eddy current brake.

9. A brake equipment for a vehicle comprising eddy current brake means having a driving connection with the vehicle, said eddy current brake means being operative to produce any selected degree of braking when energized by a predetermined current varying proportionately from a low value at high vehicle speed to a high value at low vehicle speed, a source of supply of electrical energy, a brake energizing circuit, means actuated according to the speed of vehicle for supplying a predetermined alternating current from said source to said circuit at a frequency corresponding to vehicle speed, and reactor means included in said brake energizing circuit for inductively varying the current supplied thereto in inverse proportion to variations in vehicle speed.

10. Brake control apparatus for a vehicle equipped with eddy current brake means of the type operative to develop a selected degree of braking effect when energized with a predetermined current varying proportionately from a low value at high vehicle speed to a high value at low vehicle speed, said apparatus comprising a source of direct current, a transformer having primary and secondary windings, a commutator device operative with the vehicle and interposed in circuit relation between said direct current source and said primary winding for thereby energizing said winding with alternating current at a frequency determined by the speed of said vehicle, rectifier means arranged to convert alternating current into direct current for energizing said eddy current brake means, and reactor means connected in series with said secondary winding of the transformer and said rectifier means, said reactor means being constructed and arranged to oppose the alternating current induced in said secondary winding with a reactance effect varying with the frequency and consequently with the vehicle speed.

11. Brake control apparatus for a vehicle equipped with eddy current brake means of the type operative to develop a selected degree of braking effect when energized with a predetermined current varying proportionately from a low value at high vehicle speed to a high value at low vehicle speed, said apparatus comprising a source of direct current, a controller operative to control the current from said source, a transformer having two primary windings and a secondary winding, an alternator mechanism having slip rings operative with the vehicle and constructed and arranged to convert direct current from said source into alternating current at a frequency determined by vehicle speed for sequentially energizing said primary windings, rectifier means arranged to convert alternating current into direct current for energizing said eddy current brake means, and reactor means connected in series with said secondary winding of the transformer and said rectifier means, said reactor means being constructed and arranged to effect constant regulation of the braking current supplied to said eddy current brake means in accordance with the speed of the vehicle.

CLAUDE M. HINES.